US009567730B2

(12) United States Patent
Imura et al.

(10) Patent No.: US 9,567,730 B2
(45) Date of Patent: Feb. 14, 2017

(54) WORK MACHINE (71) Applicant: HITACHI CONSTRUCTION MACHINERY CO., LTD., Tokyo (JP)

(72) Inventors: Shinya Imura, Toride (JP); Kouji Ishikawa, Kasumigaura (JP); Hidetoshi Satake, Ishioka (JP); Shinji Nishikawa, Kasumigaura (JP); Tomoaki Kaneta, Kasumigaura (JP); Shiho Izumi, Hitachinaka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/770,258

(22) PCT Filed: Aug. 28, 2014

(86) PCT No.: PCT/JP2014/072646
§ 371 (c)(1),
(2) Date: Aug. 25, 2015

(87) PCT Pub. No.: WO2015/030140
PCT Pub. Date: Mar. 5, 2015

(65) Prior Publication Data
US 2016/0002880 A1    Jan. 7, 2016

(30) Foreign Application Priority Data
Aug. 30, 2013 (JP) .................. 2013-180516

(51) Int. Cl.
*E02F 9/12* (2006.01)
*H02P 27/06* (2006.01)
(Continued)

(52) U.S. Cl.
CPC ............ *E02F 9/123* (2013.01); *B60L 11/08* (2013.01); *E02F 9/2004* (2013.01);
(Continued)

(58) Field of Classification Search
CPC ........ E02F 9/123; E02F 9/2095; E02F 9/2004; H02P 27/06
See application file for complete search history.

(56) References Cited

U.S. PATENT DOCUMENTS 4,296,367 A * 10/1981 Hirata ..................... H02P 23/04
318/808
4,349,772 A * 9/1982 Weiss ..................... H02P 27/045
318/798
(Continued)

FOREIGN PATENT DOCUMENTS

JP    2009-052339 A    3/2009
JP    2010-222815 A    10/2010
(Continued)

OTHER PUBLICATIONS

International Preliminary Report on Patentability received in corresponding International Application No. PCT/JP2014/072646 dated Mar. 10, 2016.
(Continued)

*Primary Examiner* — Tuan C. To
(74) *Attorney, Agent, or Firm* — Mattingly & Malur, PC (57) ABSTRACT A work machine prevents a fault in a swing electric motor if an uneven coil temperature increase occurs in the swing electric motor during swing press and related operations. An electricity storage device is connected to the electric motor. An inverter drives the electric motor and a swing control lever issues a command to drive the swing structure. A rotational speed detecting device detects swing speed of the swing structure and a controller controls torque of the electric motor. The controller reads the swing speed of the swing structure detected by the rotational speed detecting device to control such that, when the swing speed is zero, the torque of the electric motor is smaller than a maximum
(Continued)

torque value and, when the swing speed is a first rotational speed higher than zero, the torque of the electric motor is the maximum torque value.

5 Claims, 5 Drawing Sheets

(51) Int. Cl.
  *E02F 9/20* (2006.01)
  *B60L 11/08* (2006.01)
(52) U.S. Cl.
  CPC ............ *E02F 9/2095* (2013.01); *H02P 27/06* (2013.01); *B60L 2200/40* (2013.01); *B60L 2240/423* (2013.01); *B60L 2240/525* (2013.01)

(56) References Cited

U.S. PATENT DOCUMENTS

| | | | | |
|---|---|---|---|---|
| 9,206,587 | B2* | 12/2015 | Linstroth | E02F 3/435 |
| 2005/0253542 | A1 | 11/2005 | Sugano et al. | |
| 2012/0130576 | A1 | 5/2012 | Sugiyama et al. | |
| 2012/0238403 | A1* | 9/2012 | Koike | B62D 11/003 477/1 |
| 2012/0283919 | A1* | 11/2012 | Kuras | B60L 11/005 701/50 |
| 2013/0207582 | A1* | 8/2013 | Chi | H02P 23/0086 318/400.21 |
| 2013/0332036 | A1* | 12/2013 | Yamamoto | E02F 9/123 701/50 |
| 2014/0032059 | A1* | 1/2014 | Udagawa | E02F 9/2095 701/50 |
| 2014/0084831 | A1 | 3/2014 | Kawaguchi et al. | |
| 2014/0188373 | A1* | 7/2014 | Kawaguchi | E02F 9/2075 701/110 |
| 2015/0081147 | A1* | 3/2015 | Kawaguchi | B60L 3/0046 701/22 |

FOREIGN PATENT DOCUMENTS

| | | | | |
|---|---|---|---|---|
| JP | EP 2447423 A1 * | 5/2012 | ............. | E02F 9/123 |
| JP | 2012-244730 A | 12/2012 | | |
| JP | 2013-85426 A | 5/2013 | | |
| KR | 10-0674516 B1 | 1/2007 | | |
| SE | EP 2281953 A2 * | 2/2011 | ............. | E02F 9/123 |

OTHER PUBLICATIONS

Korean Office Action received in corresponding Korean Application No. 10-2015-7022375 dated Nov. 14, 2016.

* cited by examiner

WORK MACHINE

TECHNICAL FIELD

The present invention relates generally to work machines and, more particularly, to a work machine including a swing structure, such as a hydraulic excavator.

BACKGROUND ART

Recently developed work machines include electric motors and electricity storage devices (for example, batteries and electric double-layer capacitors) for more enhanced energy efficiency and better energy saving than in conventional work machines that employ hydraulic actuators. A known hydraulic excavator as a type of such work machines includes an electric motor in place of a conventional hydraulic motor for a swing actuator that drives and swings an upper swing structure with respect to a lower track structure (see, for example, patent document 1).

Another known arrangement includes a hydraulic motor and an electric motor as the swing actuator to drive the swing structure through combined torque of the hydraulic motor and the electric motor (see, for example, patent document 2).

Kinetic energy of the swing structure during deceleration (braking) of the swing actuator is abandoned as heat on a hydraulic circuit with the conventional hydraulic motor. With the conventional electric motor, however, the kinetic energy is expected to be regenerated as electric energy and thus greater energy saving can be achieved.

When an electric motor performs powering or regeneration, heat can be generated for causes of electrical resistance and friction. A relatively low heating value can be dissipated by a cooling device; however, a high heating value may not be sufficiently dissipated by the cooling, which causes the electric motor to become hot, resulting at times in fusion or other fault.

Patent document 1 discloses a technique that incorporates a temperature sensor for detecting temperature of coolant for cooling an inverter. When the coolant temperature is high, the technique controls and reduces an upper limit value of a current supplied to an electric motor, thereby preventing the temperatures of the electric motor and the inverter from rising inordinately.

Patent document 2 discloses a technique that incorporates temperature sensors for an electric motor and inverter. The technique controls and reduces output of the electric motor in accordance with an increase in temperatures, thereby preventing the temperatures of the electric motor and the inverter from rising inordinately.

PRIOR ART DOCUMENTS

Patent Documents

Patent Document 1: JP-2010-222815-A
Patent Document 2: JP-2009-52339-A

SUMMARY OF THE INVENTION

Problem to be Solved by the Invention

The applicant of the present invention has invented and filed an application for a patent on a work machine that includes a hydraulic motor and an electric motor to drive a swing structure, wherein the swing structure is driven only by the electric motor in a range in which efficiency in swinging by the hydraulic motor decreases, such as when a swing operation amount remains small or swing speed remains low, thereby achieving reduction in fuel consumption.

During excavation operation, for example, with a bucket held pressed up against a side surface of a ditch performed in such a work machine, or what is called swing press operation, the electric motor can develop a particular state in which, despite torque being generated, the swing speed remains zero. At this time, a current flows locally through part of coils inside the electric motor, so that the temperatures of only part of the coils increase unevenly.

In the technique disclosed in patent document 1, when, for example, an operation causes the temperatures of part of coils in the electric motor to increase, such as the above-described swing press operation, the temperature of the coolant that cools the overall electric motor only increases to some extent. Thus, no control is exercised to reduce the upper limit value of the current supplied to the electric motor, so that the temperatures of part of the coils of the electric motor continue to increase, possibly resulting in a fault.

Similarly, in the technique disclosed in patent document 2, when an operation causes the temperatures of part of coils in the electric motor to increase, such as the above-described swing press operation, the temperature sensor may not be able to detect the temperatures of the coils increasing due to the swing press operation. The reason is the temperature sensor can detect temperatures of only specific coils disposed near it at a time of such an operation. This situation can result in a fault. To solve this problem, a plurality of temperature sensors would need to be installed to detect temperatures of all coils inside the electric motor. This solution is not practical because of greater cost and space requirements involved.

The present invention has been made in view of the foregoing situation, and it is an object of the present invention to provide a work machine that prevents a swing electric motor from developing a fault if an uneven coil temperature increase occurs in the swing electric motor during swing press operation and related operations.

Means for Solving the Problem

To achieve the foregoing object, a first aspect of the present invention provides a work machine comprising: a swing structure; an electric motor for driving the swing structure; an electricity storage device connected to the electric motor; an inverter that controls driving of the electric motor; a swing control lever unit that issues a drive command to the electric motor as a drive command for the swing structure; a swing speed detecting device that detects rotational speed of the electric motor as swing speed of the swing structure; and a controller that controls torque of the electric motor, wherein the controller reads the swing speed of the swing structure detected by the swing speed detecting device to thereby control such that, when the swing speed is 0, the torque of the electric motor is smaller than a maximum torque value and, when the swing speed is a first rotational speed higher than 0, the torque of the electric motor is the maximum torque value.

Advantageous Effect of the Invention

The present invention allows the swing electric motor to be prevented from developing a fault if an uneven coil temperature increase occurs in the swing electric motor during swing press operation and related operations.

MODES FOR CARRYING OUT THE INVENTION

The following describes embodiments of the present invention using a hydraulic excavator as an example of a work machine. It should be noted that the present invention can be applied to general work machines including swing structures and the application of the present invention is not limited to the hydraulic excavator. The present invention can be applied to, for example, other types of work machines including a crane vehicle that includes a swing structure.

First Embodiment

Figure 1:
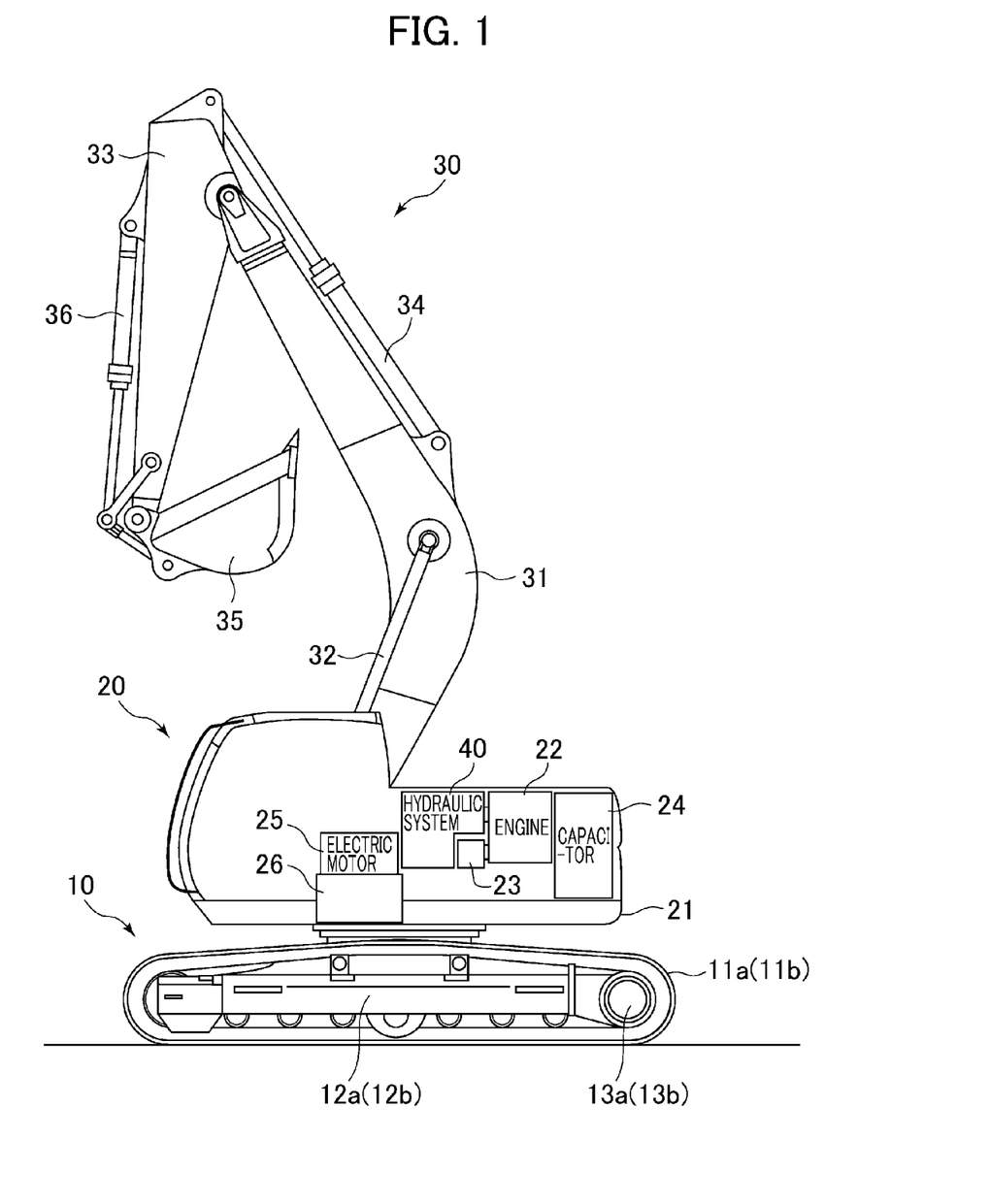
FIG. 1 is a side elevational view showing a work machine according to a first embodiment of the present invention.
Figure 2:
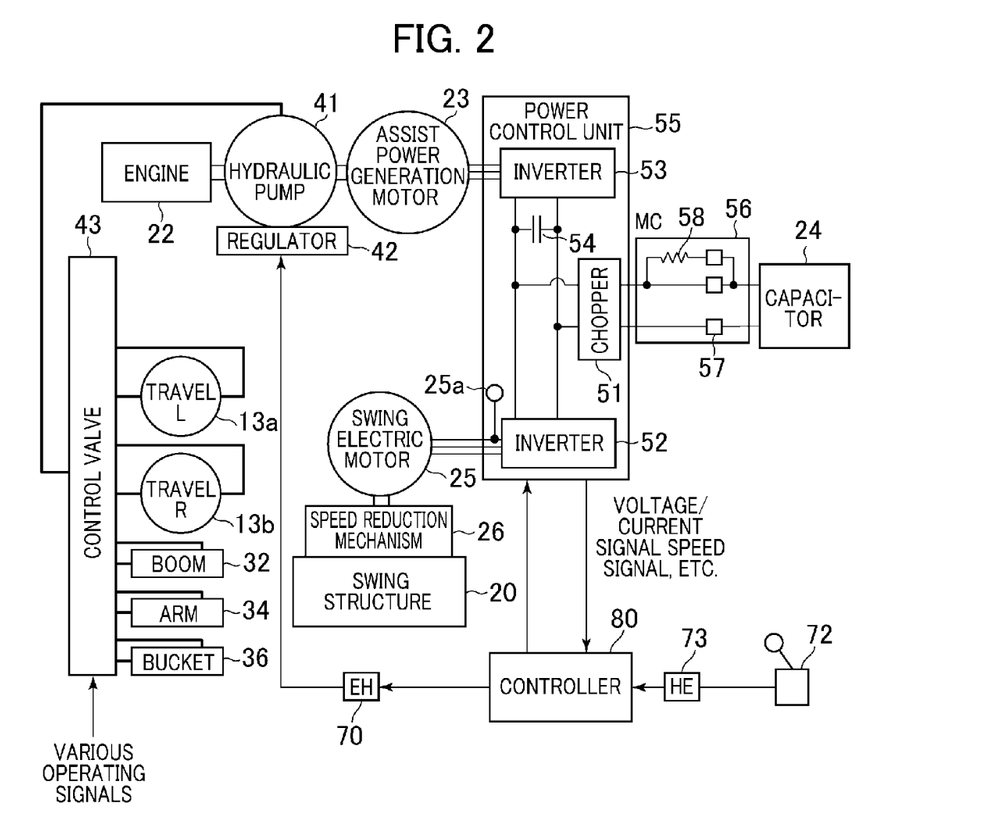
FIG. 2 is a system configuration diagram of electric and hydraulic systems included in the work machine according to the first embodiment of the present invention.

FIG. 1 is a side elevational view showing a work machine according to a first embodiment of the present invention. FIG. 2 is a system configuration diagram of electric and hydraulic systems included in the work machine according to the first embodiment of the present invention.

As shown in FIG. 1, the hydraulic excavator includes a track structure 10, a swing structure 20 mounted swingably on the track structure 10, and an excavating mechanism 30 mounted on the swing structure 20.

The track structure 10 includes: a pair of crawlers 11a and 11b; a pair of crawler frames 12a and 12b (FIG. 1 shows one on one side only); a pair of track hydraulic motors 13a and 13b that independently control and drive the crawlers 11a and 11b, respectively; and a reduction gear.

The swing structure 20 includes a swing frame 21, an engine 22, an assist power generation motor 23, a swing electric motor 25, an electric double-layer capacitor 24, and a reduction gear 26. The engine 22 as a prime mover is disposed on the swing frame 21. The assist power generation motor 23 is driven by the engine 22. The electric double-layer capacitor (hereinafter referred to as the capacitor) 24 is connected to the assist power generation motor 23 and the swing electric motor 25. The reduction gear 26 reduces rotational speed of the swing electric motor 25. A driving force of the swing electric motor 25 is transmitted via the reduction gear 26 and drives and swings the swing structure 20 (the swing frame 21) relative to the track structure 10.

The excavating mechanism (front implement) 30 is mounted on the swing structure 20. The excavating mechanism 30 includes a boom 31, a boom cylinder 32, an arm 33, an arm cylinder 34, a bucket 35, and a bucket cylinder 36. The boom cylinder 32 drives the boom 31. The arm 33 is rotatably supported at a position near a first end of the boom 31. The arm cylinder 34 drives the arm 33. The bucket 35 is rotatably supported at a distal end of the arm 33. The bucket cylinder 36 drives the bucket 35.

Additionally, a hydraulic system 40 is mounted on the swing frame 21 of the swing structure 20. The hydraulic system 40 drives hydraulic actuators including the track hydraulic motors 13a and 13b, the boom cylinder 32, the arm cylinder 34, and the bucket cylinder 36 described above. The hydraulic system 40 includes a variable displacement hydraulic pump 41 (see FIG. 2), a regulator 42, and a control valve 43 (see FIG. 2). The regulator 42 changes a tilting angle of the hydraulic pump 41 to control displacement. The control valve 43 controls and drives each actuator. The hydraulic pump 41 is rotatably driven by the engine 22 and delivers hydraulic fluid in proportion to a product of rotational speed and displacement.

The following outlines configurations of electric and hydraulic systems of the hydraulic excavator. As shown in FIG. 2, the control valve 43 operates a swing spool in accordance with an operation command (a hydraulic pilot signal) that does not instruct swing operation from a control lever unit to thus control flow rate and direction of the hydraulic fluid supplied to a swing hydraulic motor 27. The control valve 43 operates various types of spools in accordance with a operation command (hydraulic pilot signal) that does not instruct swing operation from a control lever unit to thus control the flow rate and direction of the hydraulic fluid supplied to the boom cylinder 32, the arm cylinder 34, the bucket cylinder 36, and the track hydraulic motors 13a and 13b.

The electric system includes the assist power generation motor 23, the capacitor 24, the swing electric motor 25, a power control unit 55, and a main contactor 56. The power control unit 55 includes a chopper 51, inverters 52 and 53, and a smoothing capacitor 54. The main contactor 56 includes a main relay 57 and an anti-inrush current circuit 58. Additionally, the power control unit 55 includes a rotational speed sensor 25a that detects the rotational speed of the swing electric motor 25 and outputs a detected signal to a controller 80.

DC power from the capacitor 24 is boosted to a predetermined bus bar voltage by the chopper 51 before being applied to the inverter 52 for driving the swing electric motor 25 and the inverter 53 for driving the assist power generation motor 23. The smoothing capacitor 54 stabilizes the bus bar voltage. The swing electric motor 25 drives the swing structure 20 via the reduction gear 26. The capacitor 24 is discharged or recharged depending on a driving condition of the assist power generation motor 23 and the swing electric motor 25 (whether the assist power generation motor 23 and the swing electric motor 25 perform powering or regeneration).

The controller 80 includes an input section, a calculation section, and an output section. Specifically, the input section receives, for example, a swing operation signal from a swing control lever unit 72 and a rotational speed signal of the swing electric motor 25. The calculation section uses these received signals to calculate, for example, a torque command value for the swing electric motor 25, a torque command value for the assist power generation motor 23, and an output reduction command value for the hydraulic pump 41. The output section outputs the various command values calculated by the calculation section.

The input section of the controller 80 receives a swing operation amount signal that is output from the swing control lever unit 72 and converted to a corresponding electric signal by a hydraulic-electric signal converting device (e.g., a pressure sensor) 73 and a rotational speed signal of the swing electric motor 25 detected by the rotational speed sensor 25*a*.

The output section of the controller 80 outputs to the power control unit 55 a torque command for the swing electric motor 25 and a torque command for the assist power generation motor 23 to thereby control the inverters 52 and 53, respectively. The output section of the controller 80 also outputs an output reduction command for the hydraulic pump 41 to the regulator 42 via an electric-hydraulic signal converting device 70, so that the regulator 42 controls output (displacement) of the hydraulic pump 41. The electric-hydraulic signal converting device 70 converts an electric signal from the controller 80 to a hydraulic pilot signal and corresponds, for example, to a solenoid proportional valve.

Figure 3:
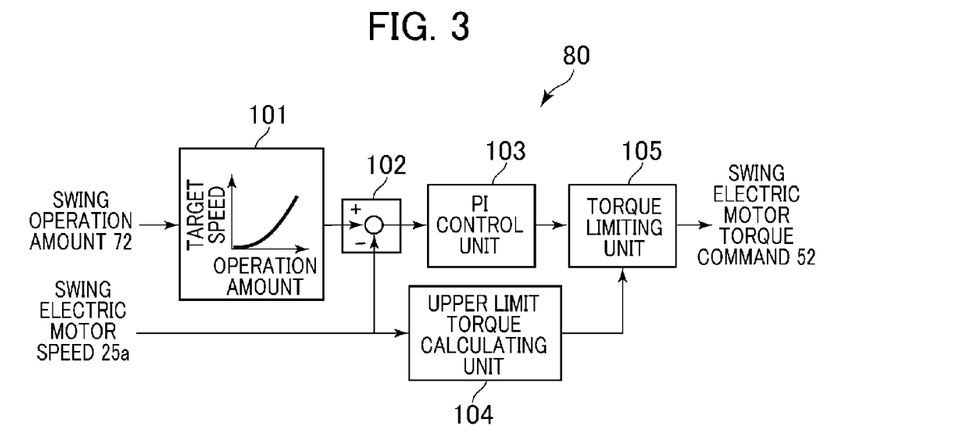
FIG. 3 is a control block diagram of a controller included in the work machine according to the first embodiment of the present invention.
Figure 4:
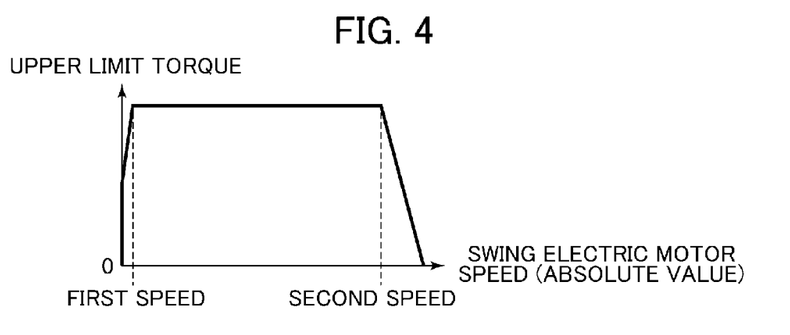
FIG. 4 is a characteristic diagram of an upper limit torque value table to which an upper limit torque calculation unit included in the work machine according to the first embodiment of the present invention refers.

The following describes, with reference to FIGS. 3 and 4, control exercised by the controller 80. FIG. 3 is a control block diagram of the controller 80 included in the work machine according to the first embodiment of the present invention. FIG. 4 is a characteristic diagram of an upper limit torque value table to which an upper limit torque calculation unit included in the work machine according to the first embodiment of the present invention refers.

As shown in FIG. 3, the calculation section of the controller 80 includes a target rotational speed calculation unit 101, a subtraction unit 102, a proportional integral (PI) control unit 103, an upper limit torque calculation unit 104, and a torque limiting unit 105.

The target rotational speed calculation unit 101 receives the swing operation amount signal and calculates a target rotational speed for the swing electric motor 25 on the basis of the swing operation amount signal. Specifically, for example, the target rotational speed calculation unit 101 refers to a target rotational speed table associated with the swing operation amount. The target rotational speed table is set as follows. The relation between the swing operation amount and the rotational speed of the swing motor is measured in advance using the conventional hydraulic excavator (one only having a hydraulic motor as a swing actuator) and the target rotational speed table is set on the basis of the result of the measurement. A signal of the target rotational speed calculated by the target rotational speed calculation unit 101 is sent to the subtraction unit 102.

The subtraction unit 102 receives a rotational speed signal of the swing electric motor 25 input thereto via a second end thereof. The subtraction unit 102 subtracts the rotational speed signal of the swing electric motor 25 from the target rotational speed signal calculated by the target rotational speed calculation unit 101 and outputs a difference signal thus calculated to the PI control unit 103.

To minimize a difference between the target rotational speed and an actual rotational speed of the swing electric motor 25, the PI control unit 103 uses a PI controller to calculate a torque command. Specifically, the torque command may be calculated, for example, by adding a rotational speed difference multiplied by a proportional gain (an output value of a proportional (P) controller) and an integrated value of the rotational speed difference multiplied by an integration gain (an output value of an integral (I) controller). The torque command signal calculated by the PI control unit 103 is sent to the first end of the torque limiting unit 105.

The upper limit torque calculation unit 104 receives the rotational speed signal of the swing electric motor 25 and calculates an absolute value of upper limit torque for the swing electric motor 25 on the basis of the rotational speed signal of the swing electric motor 25. Specifically, the upper limit torque calculation unit 104 refers to a table that defines the upper limit torque corresponding to the rotational speed of the swing electric motor 25 shown in FIG. 4 to thereby calculate the upper limit torque.

The table shown in FIG. 4 is set such that, with the upper limit torque when the rotational speed of the swing electric motor 25 is zero being about half the maximum torque, the upper limit torque increases up to the maximum torque with the increasing rotational speed for a rotational speed range from zero to a first rotational speed (for example, 10 rpm); for a rotational speed range from the first rotational speed to a second rotational speed (for example, 1000 rpm), the upper limit torque maintains the maximum torque; and for a rotational speed range above the second rotational speed, the upper limit torque is reduced to zero as the rotational speed increases. The signal of the upper limit torque calculated by the upper limit torque calculation unit 104 is sent to the second end of the torque limiting unit 105.

The first rotational speed is set in consideration of detection accuracy of the rotational speed of the swing electric motor 25. Preferably, the first rotational speed is set to nearly zero at which torque when the swing electric motor 25 is stationary can be kept substantially low. The second rotational speed is set in a manner similar to how the upper limit torque is set in ordinary electric motors. The second rotational speed is preferably set to be greater than a regular rotational speed.

The torque limiting unit 105 receives the signal of the torque command calculated by the PI control unit 103 and the signal of the upper limit torque calculated by the upper limit torque calculation unit 104, calculates a swing electric motor torque command, and outputs the swing electric motor torque command to the power control unit 55. Specifically, for example, the torque limiting unit 105 limits the signal of the torque command calculated by the PI control unit 103 to a value equal to or smaller than the signal of the upper limit torque calculated by the upper limit torque calculation unit 104 and to a value equal to or greater than the signal of the upper limit torque calculated by the upper limit torque calculation unit 104 multiplied by −1. The torque limiting unit 105 then outputs this limited value to the inverter 52 of the power control unit 55 as the torque command value for the swing electric motor 25.

The foregoing procedure allows swing electric motor torque when the rotational speed of the swing electric motor 25 is zero to be smaller, so that an uneven increase in coil temperature is prevented during swing press operation.

The work machine according to the first embodiment of the present invention described above prevents the swing electric motor 25 from becoming faulty if an uneven increase in coil temperature occurs during an operation including the swing press operation.

Second Embodiment

Figure 5:
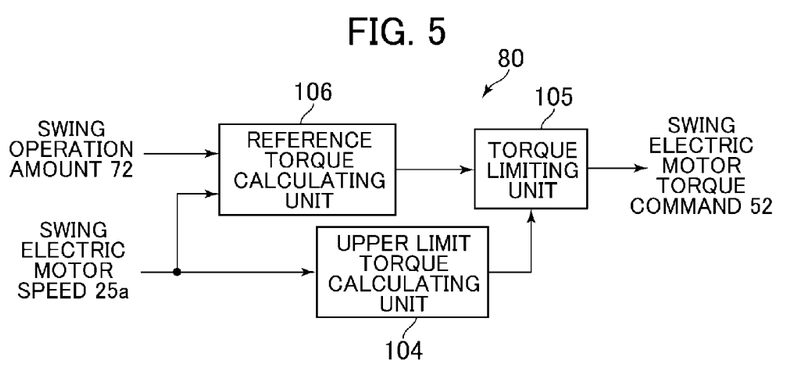
FIG. 5 is a control block diagram of a controller included in a work machine according to a second embodiment of the present invention.
Figure 6:
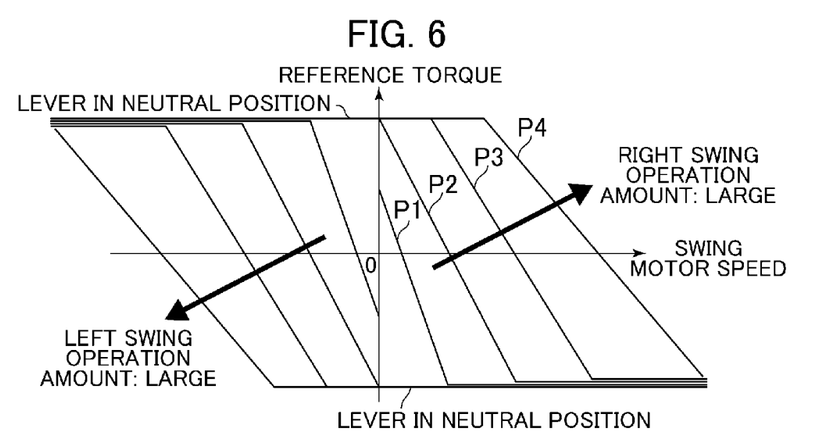
FIG. 6 is a characteristic diagram of a reference torque value table to which a reference torque calculation unit included in the work machine according to the second embodiment of the present invention refers.

The following describes, with reference to the accompanying drawings, a work machine according to a second embodiment of the present invention. FIG. 5 is a control block diagram of a controller included in the work machine according to the second embodiment of the present invention. FIG. 6 is a characteristic diagram of a reference torque value table to which a reference torque calculation unit included in the work machine according to the second embodiment of the present invention refers. In FIGS. 5 and 6, like or corresponding parts as those described with reference to FIGS. 1 to 4 are identified by the same reference numerals and descriptions for those parts will be omitted.

In the work machine according to the second embodiment of the present invention, electric and hydraulic systems are configured similarly to those in the work machine of the first embodiment, except that a calculation section of a controller 80 in the second embodiment performs processing differently from the calculation section of the controller 80 in the first embodiment.

In FIG. 5, the calculation section of the controller 80 includes a reference torque calculation unit 106 in place of the target rotational speed calculation unit 101, the subtraction unit 102, and the PI control unit 103. The calculation unit of the controller 80 further includes an upper limit torque calculation unit 104 and a torque limiting unit 105.

The reference torque calculation unit 106 receives the swing operation amount signal and the rotational speed signal of a swing electric motor 25 and, using these signals, calculates a torque command signal for the swing electric motor 25. Specifically, for example, the reference torque calculation unit 106 refers to a table based on the swing operation amount and the rotational speed of the swing electric motor 25 shown in FIG. 6 and calculates the torque command for the swing electric motor 25.

In the second embodiment of the present invention, a plurality of characteristic lines corresponding to varying swing operation amount is set in advance as shown in FIG. 6 in which the abscissa represents the rotational speed of the swing electric motor 25 and the ordinate represents the torque command (reference torque). Specifically, the table shows the rotational speed during a right turn and the reference torque command during right-turn acceleration are in the positive, and the rotational speed during a left turn and the reference torque command during left-turn acceleration are in the negative. The reference torque is calculated from a value on the ordinate of an intersection between the characteristic line of the swing operation amount and the rotational speed of the swing electric motor 25.

For example, for a right turn with the operation amount at P1, the reference torque is calculated from the intersection between a characteristic line P1 and the rotational speed of the swing electric motor 25. It is noted that the right-turn operation amount is set to satisfy the following relation: P1<P2<P3<P4. The signal of the reference torque calculated by the reference torque calculation unit 106 is sent to the first end of the torque limiting unit 105.

The torque limiting unit 105 receives the signals of the reference torque calculated by the reference torque calculation unit 106 and the upper limit torque calculated by the upper limit torque calculation unit 104 and calculates a swing electric motor torque command to output the swing electric motor torque command to a power control unit 55. Specifically, for example, the torque limiting unit 105 limits the signal of the reference torque calculated by the reference torque calculation unit 106 to a value that is equal to or smaller than the signal of the upper limit torque calculated by the upper limit torque calculation unit 104 and to a value that is equal to or greater than the signal of the upper limit torque calculated by the upper limit torque calculation unit 104 multiplied by −1. The torque limiting unit 105 then outputs this limited value to an inverter 52 of the power control unit 55 as the torque command value for the swing electric motor 25.

The work machine according to the second embodiment of the present invention described above can achieve the same effect as that achieved by work machine according to the first embodiment of the present invention described above.

Third Embodiment

Figure 7:
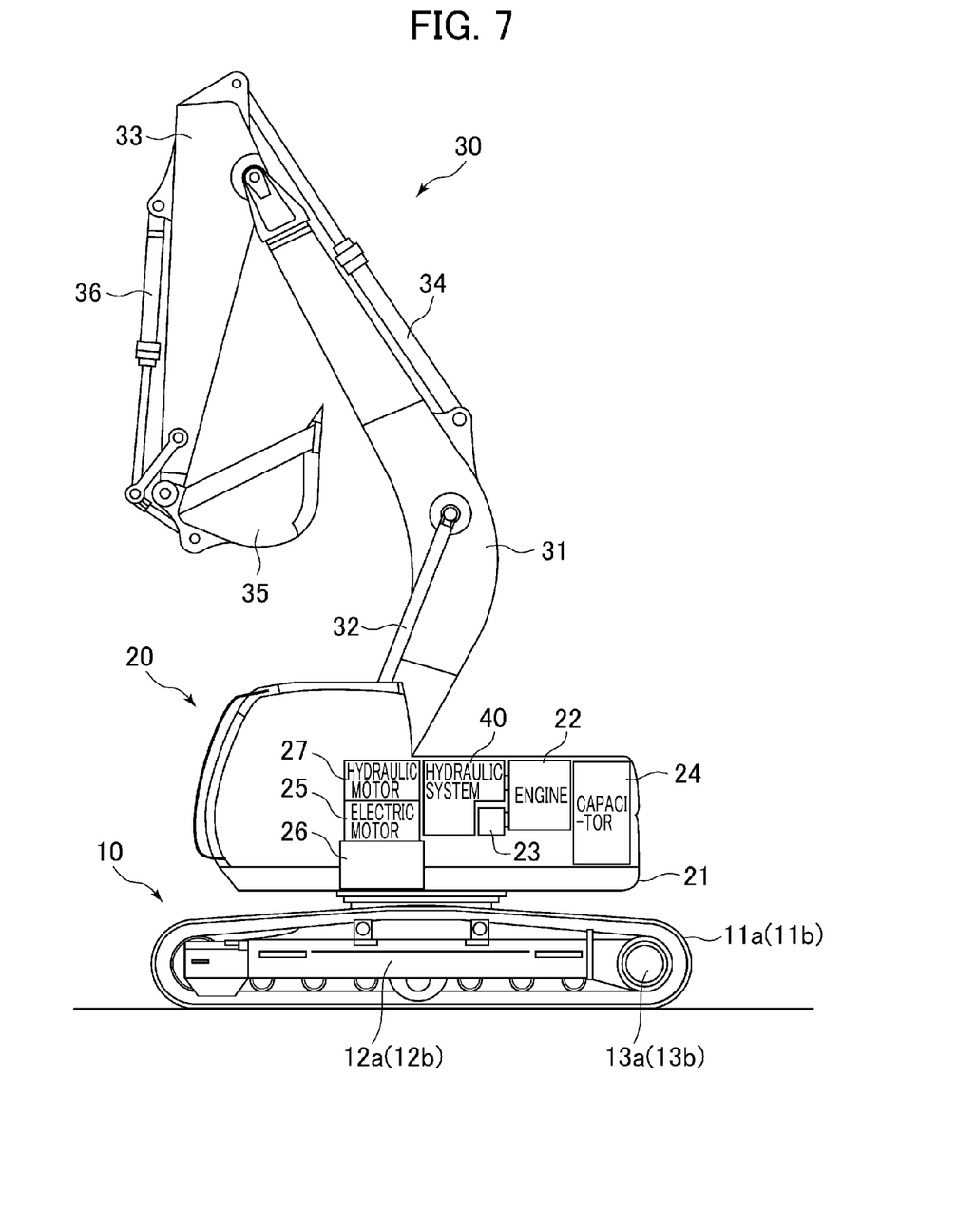
FIG. 7 is a side elevational view showing a work machine according to a third embodiment of the present invention.
Figure 8:
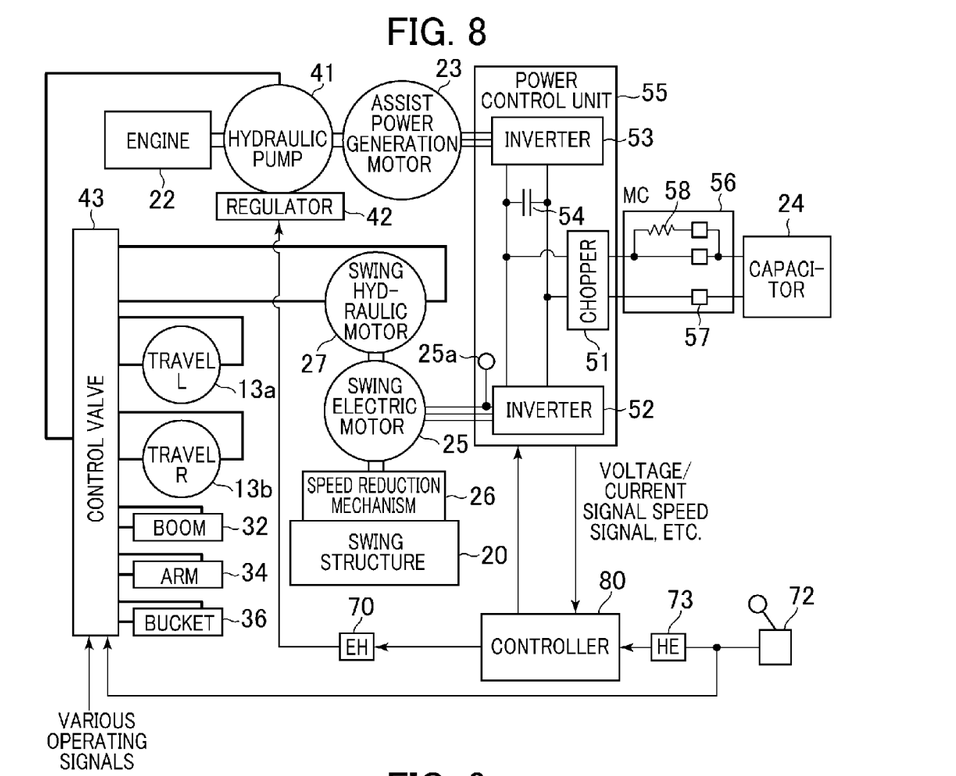
FIG. 8 is a system configuration diagram of electric and hydraulic systems included in the work machine according to the third embodiment of the present invention.
Figure 9:
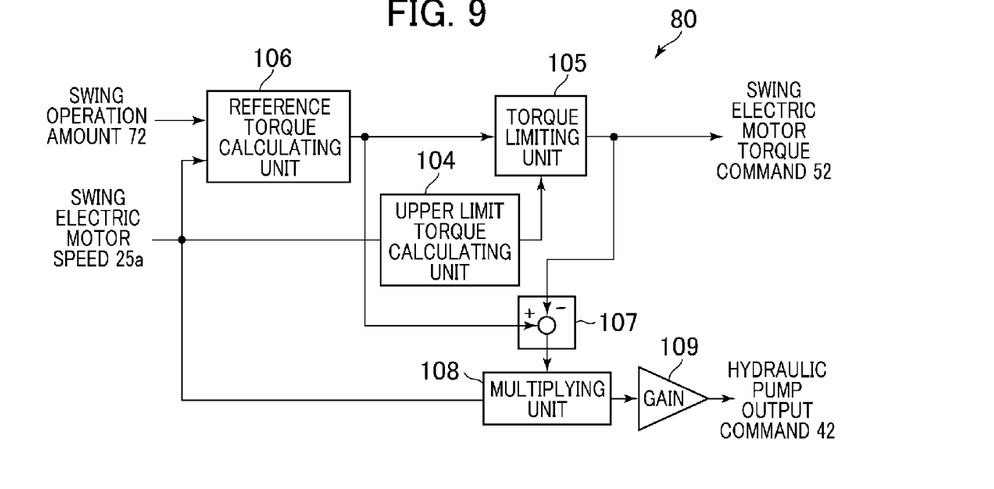
FIG. 9 is a control block diagram of a controller included in the work machine according to the third embodiment of the present invention.

The following describes, with reference to the accompanying drawings, a work machine according to a third embodiment of the present invention. FIG. 7 is a side elevational view showing the work machine according to the third embodiment of the present invention. FIG. 8 is a system configuration diagram of electric and hydraulic systems included in the work machine according to the third embodiment of the present invention. FIG. 9 is a control block diagram of a controller included in the work machine according to the third embodiment of the present invention. In FIGS. 7 and 9, like or corresponding parts as those described with reference to FIGS. 1 to 6 are identified by the same reference numerals and descriptions for those parts will be omitted.

While the first embodiment described with reference to FIGS. 1 and 2 uses only the swing electric motor 25 to drive the swing structure 20, the third embodiment further includes a swing hydraulic motor 27 disposed coaxially with a swing electric motor 25, thereby driving a swing structure 20 with combined torque derived from the swing electric motor 25 and the swing hydraulic motor 27. In addition, the swing structure 20 is driven only with the swing electric motor 25 in a range in which efficiency in swing by the swing hydraulic motor 27 decreases, such as when the swing operation amount is small or the swing speed is extremely low.

Reference is made to FIG. 7, in which the swing structure 20 includes a swing frame 21, an engine 22, an assist power generation motor 23, the swing electric motor 25, the swing hydraulic motor 27, a capacitor 24, and reduction gear 26. The engine 22 as a prime mover is disposed on the swing frame 21. The assist power generation motor 23 is driven by the engine 22. The capacitor 24 is connected to the assist power generation motor 23 and the swing electric motor 25. The reduction gear 26 reduces rotational speed of the swing electric motor 25 and the swing hydraulic motor 27. Driving forces of the swing electric motor 25 and the swing hydraulic motor 27 are transmitted via the reduction gear 26 and drive and swing the swing structure 20.

As shown in FIG. 8, a driving force of the engine 22 is transmitted to a hydraulic pump 41. A control valve 43 controls the flow rate and direction of the hydraulic fluid supplied to the swing hydraulic motor 27 in accordance with a swing operation command (hydraulic pilot signal) from a swing control lever unit 72. The control valve 43 further controls the flow rate and direction of the hydraulic fluid supplied to a boom cylinder 32, an arm cylinder 34, a bucket cylinder 36, and track hydraulic motors 13a and 13b in accordance with an operation command (hydraulic pilot signal) instructing other operations than swing from a control lever unit (not shown).

DC power from the capacitor 24 is boosted to a predetermined bus bar voltage by a chopper 51 before being applied to an inverter 52 for driving the swing electric motor 25 and an inverter 53 for driving the assist power generation motor 23. A smoothing capacitor 54 stabilizes the bus bar voltage. The swing electric motor 25 has a rotational shaft connected to a rotational shaft of the swing hydraulic motor 27. The swing electric motor 25 and the swing hydraulic motor 27 drive the swing structure 20 via the reduction gear 26. The capacitor 24 is discharged or recharged depending on a driving condition of the assist power generation motor 23 and the swing electric motor 25 (whether the assist power generation motor 23 and the swing electric motor 25 perform powering or regeneration).

A controller 80 includes an input section, a calculation section, and an output section. Specifically, the input section inputs, for example, a swing operation signal from the swing control lever unit 72 and a rotational speed signal of the swing electric motor 25. The calculation section uses these input signals to calculate, for example, a torque command value for the swing electric motor 25, a torque command value for the assist power generation motor 23, and an output reduction command value for the hydraulic pump 41. The output section outputs the various command values calculated by the calculation section.

The input section of the controller 80 receives a swing operation amount signal that is output from the swing control lever unit 72 and converted to a corresponding electric signal by a hydraulic-electric signal converting device (e.g., a pressure sensor) 73 and a rotational speed signal of the swing electric motor 25 detected by the rotational speed sensor 25a.

The output section of the controller 80 outputs to a power control unit 55 a torque command for the swing electric motor 25 and a torque command for the assist power generation motor 23, to thereby control the inverters 52 and 53, respectively. The output section of the controller 80 also outputs an output reduction command for the hydraulic pump 41 to a regulator 42 via an electric-hydraulic signal converting device 70, so that the regulator 42 controls output (displacement) of the hydraulic pump 41. The electric-hydraulic signal converting device 70 converts an electric signal from the controller 80 to a hydraulic pilot signal and corresponds, for example, to a solenoid proportional valve.

When an operator operates the swing control lever unit 72, a hydraulic pilot signal according to the operating direction and amount of the swing control lever unit 72 is generated and sent to the control valve 43. In addition, the swing operation amount signal, or an electric signal resulting from conversion, is also sent to the controller 80 via the hydraulic-electric signal converting device 73. This results in the swing electric motor 25 being driven with power supplied from the capacitor 24. Additionally, the control valve for the swing hydraulic motor 27 is opened as necessary to thereby drive the swing hydraulic motor 27.

In the third embodiment of the present invention, the torque command for the swing electric motor 25 and the output command for the hydraulic pump 41 are at this time calculated and output on the basis of the swing operation amount and the rotational speed of the swing electric motor 25.

The following describes, with reference to FIG. 9, control exercised by the controller 80. Reference is made to FIG. 9, in which the calculation section of the controller 80 includes the upper limit torque calculation unit 104, the torque limiting unit 105, and the reference torque calculation unit 106 of the second embodiment. The calculation section of the controller 80 further includes a second subtraction unit 107, a multiplication unit 108, and a gain calculation unit 109.

The upper limit torque calculation unit 104, the torque limiting unit 105, and the reference torque calculation unit 106 are configured in the same manner as those in the second embodiment and descriptions therefor will be omitted. It should, however, be noted that the upper limit torque table used by the upper limit torque calculation unit 104 in the third embodiment is set to smaller values than the upper limit torque values in the second embodiment. As a result, the swing electric motor 25 is simply unable to meet the requirements of the reference torque signal from the reference torque calculation unit 106. Control is thus provided to compensate for shortage of the reference torque equivalent to what is required in the conventional hydraulic excavator with the swing hydraulic motor 27.

The second subtraction unit 107 receives the reference torque signal calculated by the reference torque calculation unit 106 and the swing electric motor torque command signal calculated by the torque limiting unit 105 and subtracts the swing electric motor torque command signal from the reference torque signal to thereby input the calculated difference signal to the multiplication unit 108. Specifically, the second subtraction unit 107 calculates a difference between the reference torque and the torque of the swing electric motor 25 and applies the difference to the multiplication unit 108.

The multiplication unit 108 receives the rotational speed signal of the swing electric motor 25 and the difference signal calculated by the second subtraction unit 107 and multiplies the formal signal by the latter one to calculate a target output of the swing hydraulic motor 27. The calculated target output signal is sent to the gain calculation unit 109.

The gain calculation unit 109 receives the target output of the swing hydraulic motor 27 calculated by the multiplication unit 108 and multiplies the input target output by a predetermined gain to find a hydraulic pump output command value. The gain calculation unit 109 then outputs the calculated hydraulic pump output command value to the regulator 42 via the electric-hydraulic signal converting device 70 to thereby control the output (displacement) of the hydraulic pump 41. The predetermined gain is set, for example, to a reciprocal of efficiency from the output of the hydraulic pump 41 to the output of the swing hydraulic motor 27. This setting of the gain allows the output of the swing hydraulic motor 27 to be the value calculated by the multiplication unit 108. Additionally, the setting of the gain enables the drive only with the swing electric motor in the range in which efficiency in swing by the swing hydraulic motor decreases, so that reduction in fuel consumption is achieved.

The work machine according to the third embodiment of the present invention described above achieves the same effect as that achieved by the work machine according to the first embodiment of the present invention described above.

In the work machine according to the third embodiment of the present invention, while the torque of the swing electric motor 25 is controlled to be minimized when the rotational speed of the swing structure is zero, the torque of the swing hydraulic motor 27 is controlled to increase when the rotational speed of the swing structure is not zero. This control enables generation of torque identical to that in the conventional hydraulic excavator, thus ensuring operability.

DESCRIPTION OF REFERENCE CHARACTERS

10 Track structure
11 Crawler

12 Crawler frame
13 Track hydraulic motor
20 Swing structure
21 Swing frame
22 Engine
23 Assist power generation motor
24 Capacitor.
25 Swing electric motor
25a Rotational speed sensor
26 Reduction gear
27 Swing hydraulic motor
30 Excavating mechanism
31 Boom
32 Boom cylinder
33 Arm
34 Arm cylinder
35 Bucket
36 Bucket cylinder
40 Hydraulic system
41 Hydraulic pump
42 Regulator
43 Control valve
51 Chopper
52 Inverter for driving electric motor
53 Inverter for driving assist power generation motor
54 Smoothing capacitor
55 Power control unit
56 Main contactor
57 Main relay
58 Anti-inrush current circuit
70 Electric-hydraulic signal converting device
72 Swing control lever unit
80 Controller
101 Target rotational speed calculation unit
102 Subtraction unit
103 PI control unit
104 Upper limit torque calculation unit
105 Torque limiting unit
106 Reference torque calculation unit
107 Second subtraction unit
108 Multiplication unit
109 Gain calculation unit

The invention claimed is:

1. A work machine comprising:
a swing structure;
an electric motor for driving the swing structure;
an electricity storage device connected to the electric motor;
an inverter that controls driving of the electric motor;
a swing control lever unit that issues a drive command to the electric motor as a drive command for the swing structure;
a swing speed detecting device that detects rotational speed of the electric motor as swing speed of the swing structure; and
a controller that controls torque of the electric motor, wherein
the controller reads the swing speed of the swing structure detected by the swing speed detecting device to thereby control such that, when the swing speed is zero, the torque of the electric motor is smaller than a maximum torque value and, when the swing speed is a first rotational speed higher than zero, the torque of the electric motor is the maximum torque value.

2. The work machine according to claim 1, further comprising
a operation amount detecting device that detects an operation amount of the swing control lever unit, wherein the controller includes:
a reference torque calculation unit that reads the operation amount of the swing control lever unit detected by the operation amount detecting device and the rotational speed of the electric motor detected by the swing speed detecting device to thereby calculate a reference torque command for the electric motor;
an upper limit torque calculation unit that calculates an upper limit torque value of the electric motor in accordance with the rotational speed of the electric motor; and
a torque limiting unit that receives the reference torque command from the reference torque calculation unit and the upper limit torque value from the upper limit torque calculation unit and outputs, to the inverter, the reference torque command limited to the upper limit torque value as a torque command.

3. The work machine according to claim 2, wherein the upper limit torque calculation unit calculates the upper limit torque value of the electric motor such that:
for a range of the swing speed of the swing structure from zero to the first rotational speed higher than zero, the upper limit torque value of the electric motor increases with an increasing swing speed;
for a range of the swing speed of the swing structure from the first rotational speed to a second rotational speed that is equal to or higher than the first rotational speed and is higher than a regular rotational speed, the upper limit torque value of the electric motor is a maximum value; and
for a range of the swing speed of the swing structure equal to or higher than the second rotational speed, the upper limit torque value of the electric motor decreases with an increasing swing speed.

4. The work machine according to claim 2, further comprising:
an engine;
a hydraulic pump driven by the engine;
a regulator that controls output of the hydraulic pump; and
a hydraulic motor, driven by hydraulic fluid delivered from the hydraulic pump, for driving the swing structure with combined torque derived from the electric motor and the hydraulic motor, wherein
the controller includes:
a subtraction unit that receives the reference torque command from the reference torque calculation unit and the torque command from the torque limiting unit and outputs, to a multiplication unit, a value that represents the torque command subtracted from the reference torque command as a difference signal;
the multiplication unit receiving the difference signal from the subtraction unit and the swing speed and calculates a target output of the hydraulic motor by multiplying the difference signal by the swing speed; and
a gain calculation unit that outputs, to the regulator, a value of the target output from the multiplication unit multiplied by a predetermined gain as a hydraulic pump output command value.

5. The work machine according to claim 4, wherein the upper limit torque value of the electric motor in the upper limit torque calculation unit is set to be smaller than a setting value for a configuration that includes no hydraulic motor.

* * * * *